United States Patent [19]

Ladlow

[11] 3,888,000
[45] June 10, 1975

[54] FRUIT AND VEGETABLE CUTTING DEVICES

[76] Inventor: Frank Willows Ladlow, Sea Croft Lodge, 133 Drummond Rd., Skegness, England

[22] Filed: June 21, 1973

[21] Appl. No.: 372,403

[30] Foreign Application Priority Data
June 23, 1972 United Kingdom.............. 29422/72
Jan. 5, 1973 United Kingdom.................. 505/73

[52] U.S. Cl. ...................... 30/114; 30/176; 30/178; 30/183; 30/272 R; 30/287
[51] Int. Cl.......................... A21c 5/08; B26b 27/00
[58] Field of Search ....... 30/114, 113.1, 113.2, 303, 30/302, 301, 316, 176, 272 R, 287, 294, 178, 183

[56] References Cited
UNITED STATES PATENTS

| | | |
|---|---|---|
| 1,418,868 | 6/1922 | Fogelquist............................ 30/114 |
| 1,420,341 | 6/1922 | Polk................................. 30/303 X |
| 2,317,540 | 4/1943 | Lanham................................. 30/114 |
| 2,534,595 | 12/1950 | Hamilton......................... 30/316 X |
| 3,190,330 | 6/1965 | Hawkins.......................... 30/114 X |
| 3,192,263 | 7/1965 | Guerrero......................... 30/294 X |
| 3,482,311 | 12/1969 | Farris............................... 30/316 X |

Primary Examiner—Al Lawrence Smith
Assistant Examiner—J. T. Zatarga
Attorney, Agent, or Firm—Paul & Paul

[57] ABSTRACT

Cutting apparatus for cutting fruit and vegetables into predetermined shapes, comprising means for locating the fruit or vegetable to be cut, a plurality of shaped cutters surrounding the fruit or vegetable in the held position and means for moving said cutters radially inwards so as to pierce and to cut the fruit or vegetable into desired shape.

2 Claims, 2 Drawing Figures

FRUIT AND VEGETABLE CUTTING DEVICES

This invention is for improvements in or relating to cutting devices and has for one object to provide an improved device intended for the cutting of fruit and vegetables into predetermined shapes.

The invention has particular application to cutting of oranges, lemons, tomatoes and other substantially spherical fruits or vegetables into a flower shape. That is to say, a shape in which the substantially spherical fruit or vegetable is cut into half but with the marginal edges in a castellated form thus representing an appearance of a flower petal.

It is known to cut tomatoes and similar into this shape for decorative purposes for placing on plates of salad and the like and it will be appreciated that in catering establishments that the cutting of numerous tomatoes into this shape is time consuming and results in an uneven cut even by persons who are highly experienced and practised in this art.

It is one object of the present invention to provide a cutting device which will uniformly and automatically cut such spherical fruit and vegetables into a uniform flower shape.

Accordingly, the present invention provides cutting apparatus for the purpose hereinbefore defined, comprising means for locating the fruit or vegetables to be cut, a plurality of shaped cutters surrounding the fruit or vegetable in the held position and means for moving said cutters radially inwards so as to piece and to cut the fruit or vegetable into the desired shape. Clearly, the cutting members will need to be provided with a point which will meet at the centre so that the fruit or vegetable is appropriately severed in two.

Conveniently the invention provides for means which automatically and simultaneously pierce the fruit in all directions so that said means provide for the moving of the cutters radially inward simultaneously.

The invention also provides for the hand movement of individual cutters inward radially in order to cut the fruit in sections separately.

Desirably, the cutters will be of angular form in cross section with the forward cutting edge tapered rearwardly from the cutting point. The means for arranging the cutting members inwardly may, for example, comprise a plurality of spiral cams with a part on the cutting member adapted to engage in the cam track so that by rotation of the cam member all the cutting members are urged inwardly simultaneously. Desirably the apparatus will be made in such form that the parts and components may be readily removed therefrom for cleaning, washing and drying purposes and adapted for easy re-assembly.

In order that the present invention may be more readily understood reference is now made to the drawings in which:-

Figure 1:
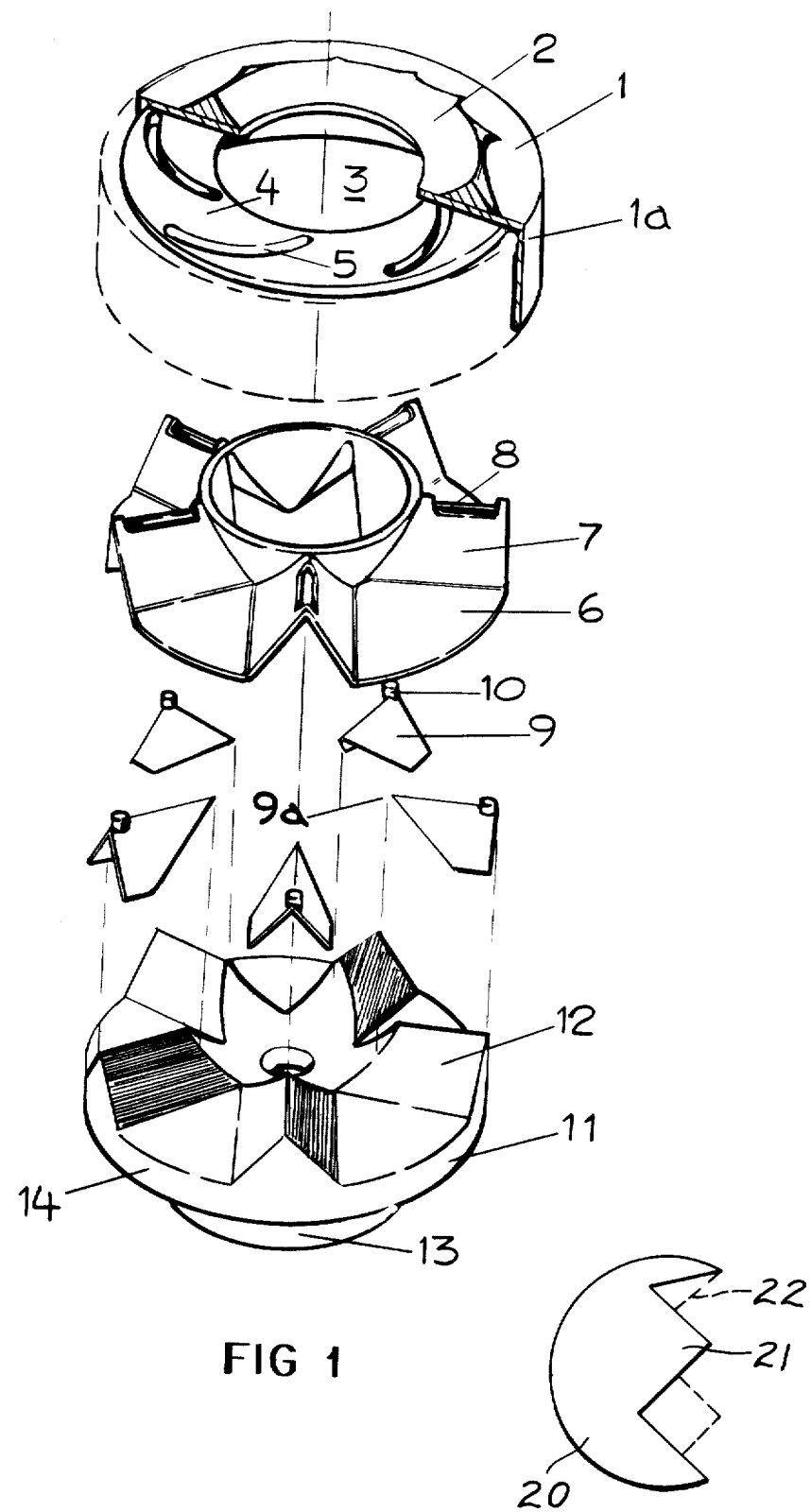
FIG. 1 is an exploded perspective view of apparatus according to the present invention.

Referring firstly to FIG. 1 an outer casing 1 formed of suitable plastics material is provided with a central aperture 3 and with a raised surface 2 with appropriate finger holds to enable the casing 1 to be rotated. The casing 1 is provided with a downwardly extending skirt 1a from the upper surface in which the finger holds 2 are provided. Formed on underside of the top surface of the casing 1 is a cam surface 4 having a plurality of cam tracks 5. The cam tracks will normally be cut into the under surface of the casing 1. A blade holder 6 is adapted to be located beneath the cam surface 4. The blade holder 6 is in the present instance provided with five blade housing portions 7 each of which is provided at its upper end with a slot 8, blade members 9 are adapted to be located within the blade holder 7. The blade members 9 have a spigot 10 which extends through the slot 8 so that the spigot 10 engage in a cam track on the cam surface 4. The members 9 are of substantially angular form with a point at their forward end and with a tapered cutting edge extending along the angled edge rearwardly from the cutting point indicated at 9a. In order to locate the members 9 in the blade holder 7 a moulding of suitable plastics material 12 forms the base portion of the aperture according to the present invention.

The base portion 11 is provided with angular upstanding parts 12 and with a handle on the rear surface 13. Desirably, on the peripheral edge 14 of the base part 11 are provided means for integral engagement for the skirt 1a to the member 1 in order to lock releasably the base part 11 to the member 1 in a manner which permits relative rotation of the two parts.

It will be appreciated that as the two parts are rotated relative to each other that the spigot 10 of the members 9 engaging into the cam tracks 5 and will thus force all the blades radially inwards simultaneously.

Figure 2:
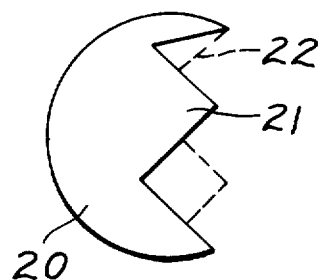
FIG. 2 is a view of a spherical fruit cut by apparatus according to the present invention.

It will be seen from FIG. 2 that a spherical fruit such as a tomato 20 is cut into castellated form having peaks 21 and troughs 22 which using the triangular cutter members 9 form triangular peaks 21 and troughs 22.

Thus a tomato or similar fruit or vegetable located within the aperture 3 will be simultaneously pierced by five different members 9 which will form the tomatoe with an angular cut peripheral surface thus representing the traditional flower cut for such fruits or vegetables.

What I claim is:

1. A cutting device, adapted to bisect tomatoes, other eatable produce and the like into portions having castellated edges, comprising:

a base member having a plurality of angular upstanding portions, and having a tomato-receiving center space;

a plurality of angular blade members with upstanding spigot portions, said blade members adapted to rest freely upon the angular upstanding portions of said base member and to be reciprocably slidable thereupon;

a blade holder member, adapted to fit matingly over said base member and said blade members, having a tomato-receiving center space, having a plurality of angular upstanding portions corresponding to the angular upstanding portions of said base member, each blade holder member angular upstanding portion having a spigot slot through which the spigot portion of said blade members is adapted to project and in which the spigot portion of said blade members is adapted to be free to reciprocally slide;

an outer casing member, adapted to engagingly fit over said base member, said blade members, and said blade holder member, having a tomato-receiving center space, said outer casing member having a top under cam surface with a plurality of arcuate cam tracks adapted to engage the spigot portions of said blade members, said outer casing member being rotatable about said base member, said blade members, and said blade holder member; and said cam tracks adapted to, during rotation of said outer casing member, reciprocally slide the spigot portions of said blade members radially inward toward the center of the tomato-receiving center space, thus reciprocally sliding simultaneously all of said blade members on the angular upstanding portions of said base member towards the center of the tomato-receiving center space.

2. A cutting device according to claim 1, wherein said plurality of angular blade members is an odd number.

* * * * *